Aug. 13, 1957    A. GORDON ET AL    2,802,950
X-RAY FILM PACKAGE
Filed Oct. 19, 1953    2 Sheets-Sheet 1
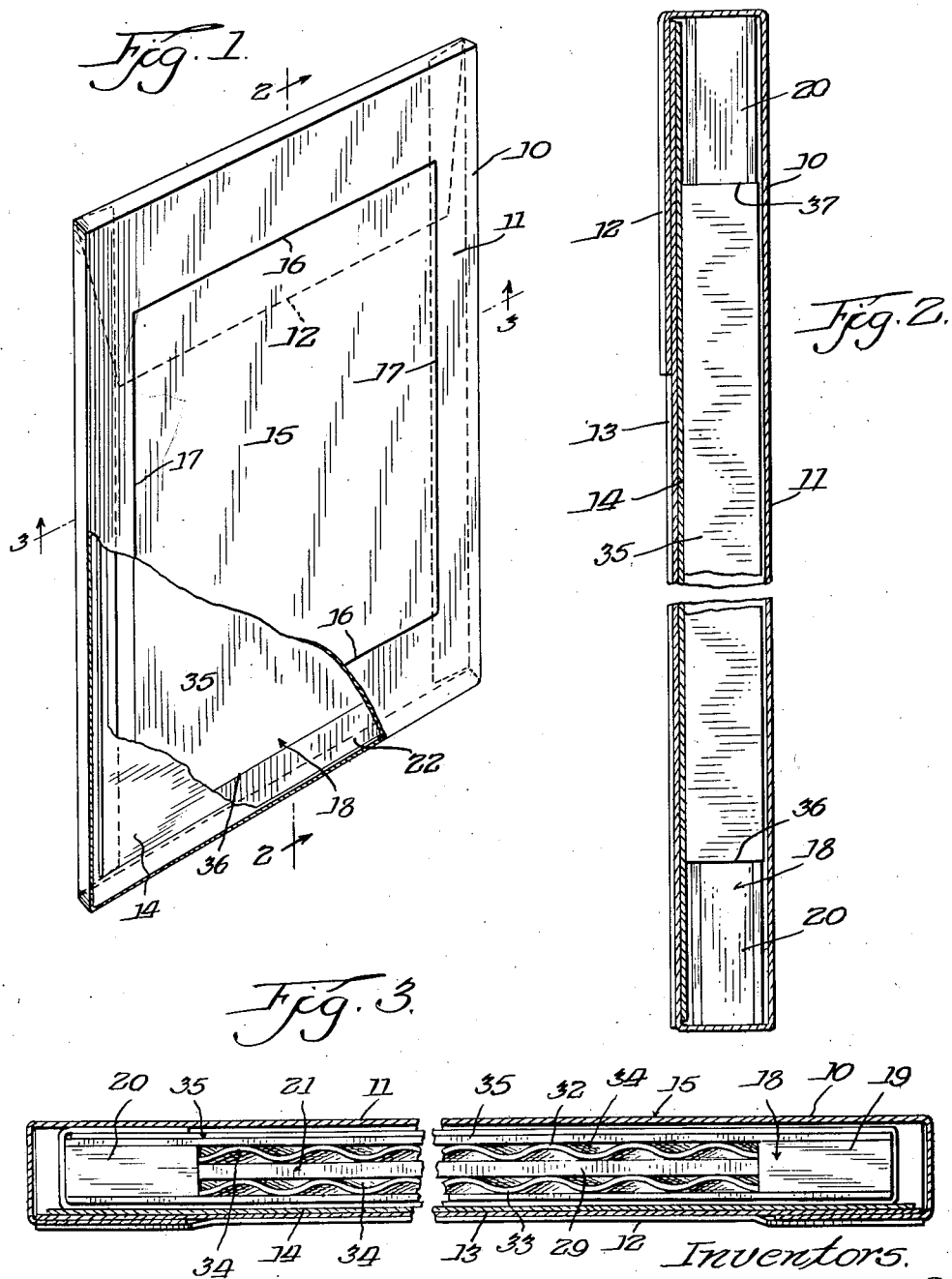

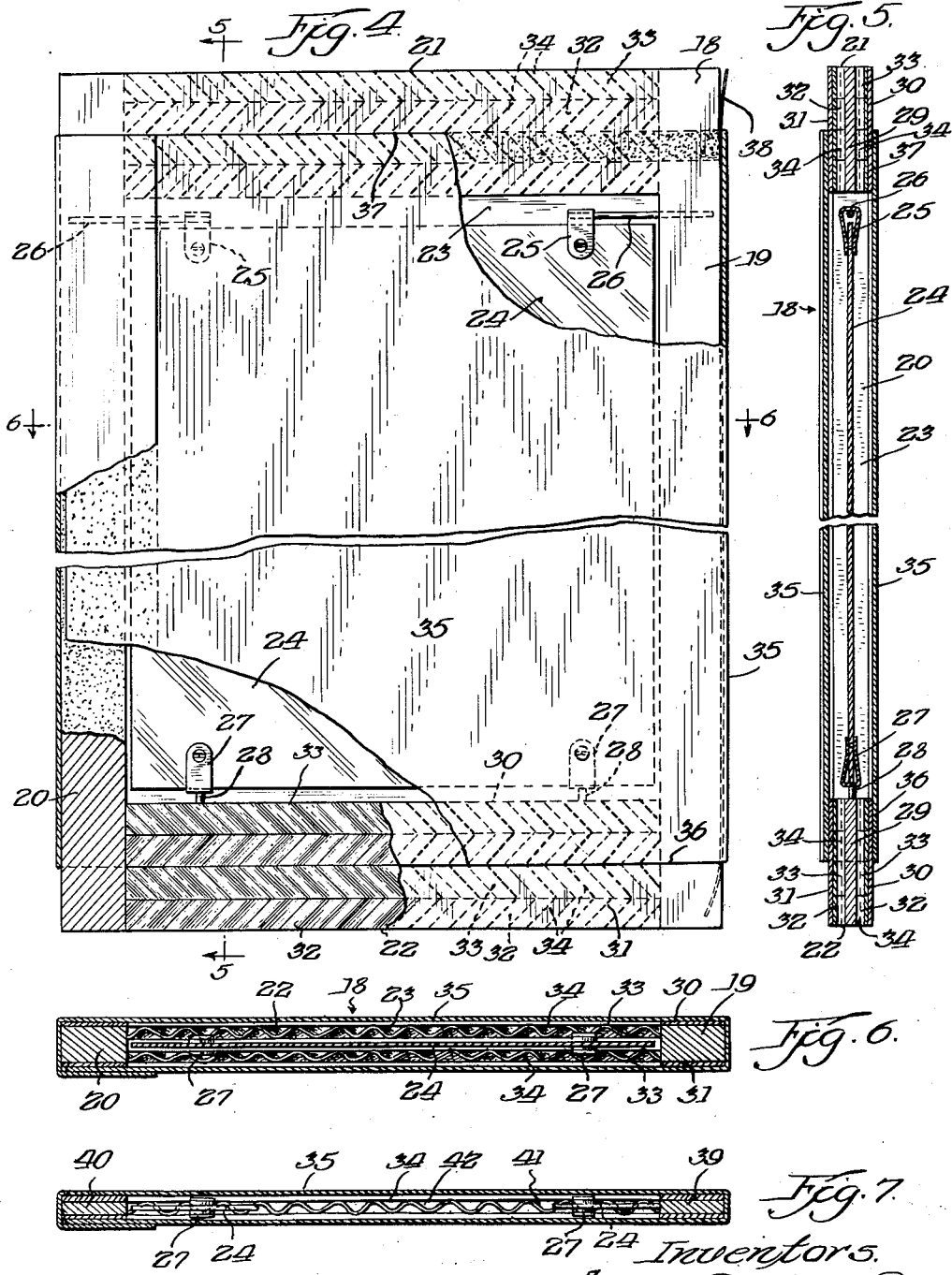

United States Patent Office 2,802,950
Patented Aug. 13, 1957

2,802,950

X-RAY FILM PACKAGE

Aaron Gordon, Skokie, and Harry B. Gordon, Highland Park, Ill.

Application October 19, 1953, Serial No. 386,715

5 Claims. (Cl. 250—68)

Our invention relates to an X-ray film package and has for its primary object the provision of a package consisting preferably of an outer envelope or covering for convenience in handling and protection for the film, and a packet in said envelope removable as a unit therefrom, the package being transparent to X-rays from one side only and opaque to ordinary light rays from all directions, with an X-ray film being mounted in the packet, which packet can be removed from the envelope or covering and the film while in the packet completely or partially processed into a negative by a physician or technician in an ordinary room illuminated by either natural or artificial light without the use of a dark room, the film in the packet being protected from ordinary light rays by opaque wrappings until the processing of the film is advanced to such a stage that light rays have no effect upon it.

Another object of our invention is the provision of an X-ray film package through the use of which a physician in his office can take and process a picture to a point where it can be exposed to light for viewing purposes, all in a matter of minutes, and in the course of consultation with a patient while in his office without the use of a dark room and a large quantity of developing equipment now in common use for such purposes, and with a very small amount of equipment.

Another and further object of our invention is the provision of an X-ray film package which is convenient for use by a practicing physician in his own office without the necessity of having a dark room and whereby he may take an X-ray photograph, process it very quickly and have the benefit of the use of the picture during the course of his examination of a patient, or in case of a minor operation, such as the setting of a broken bone, or the like, a picture can be immediately taken to determine the extent of the break and the position of the bones resulting from a break or dislocation and through the use of the X-ray photograph the necessary setting can be more readily and better performed by the physician attending to the setting of such bone fractures, dislocations, or the like. Likewise, after the setting operation is complete, a physician can quickly take another X-ray picture and process it readily so that he can then examine the position of the bones and determine whether the setting operation has been satisfactorily performed, whether the bones are back in their normal position and immediately make any changes in the position of the bones, or the like, which may be desirable or necessary to insure that they have been restored to their former normal position.

Another and further object of our invention is the provision of an X-ray film pack which can be used with ordinary X-ray apparatus and which, after being exposed to the X-rays, can be easily and quickly processed in the office of a physician or technician without the use of a dark room and the care which it is necessary to exercise in the taking of X-ray pictures to make sure that the negative does not become exposed to light, either before or after the picture is taken and before the film is processed, thereby destroying the value of the film and in this manner the sufficiency of the X-ray picture can be determined by the physician or technician while his patient is available during an examination and without the necessity of taking X-ray pictures and having them processed later by a laboratory, or the like, which is now common practice.

Another and further object of our invention is the provision of an X-ray pack having a sensitized X-ray film mounted therein in such manner that it may be used for exposure in the taking of an X-ray picture and which film can be handled while still in the frame in ordinary light without the necessity of a dark room, and the processing of the film, consisting of the usual steps of development, rinsing, fixing bath and the washing of the film, can all be performed, if desired or necessary, without removal of the film from the packet. If desired during the steps of the processing, after the development, rinsing and fixing, the coverings protecting the film from the light may be removed and the film examined for a short period of time before subjecting the film to the final fixing bath and the final washing to determine if the film is satisfactory and what the physician is seeking to discover, and the final steps of the processing of the film performed afterwards so the image is permanently fixed for future reference.

Another and further object of our invention is the provision of a film pack having a film mounted therein, sensitized to X-rays and which is so mounted in a frame that ordinary rays of light are excluded therefrom but tortuous channels are provided in the frame members through which the processing fluid enters and the air is forced from the inside of the chamber in the package containing the film to provide for the processing of the film for preliminary observation, if desired, or for the complete processing of the film if it is desired to handle it in this manner.

Another and further object of our invention is the provision of an X-ray package in which the film is mounted under tension in a frame so as to keep the film taut under all conditions of operation, so that handling of the frame can be performed during the processing or preliminary viewing of the film after processing and before the final washing of the film after processing without the fingers of the technician coming into contact with the film or negative at any time during the processing of the film or even after the completion of the processing of the film into a negative.

Another and further object of our invention is the provision of an X-ray film package in which the film is mounted in a chamber which permits full and complete contact of the fluids used in the processing to come into contact with the film and in which the film is mounted under tension to insure uniform action upon the surface of the film by the processing fluids and to counteract the stretching of the film when wet and to compensate for the shrinkage of the film as it dries after the final steps of its processing.

These and other objects of our invention will be more fully and better understood by reference to the accompanying drawings, and in which—

Fig 1 is a perspective view of our complete film pack with portions broken away to show some of the inner portions of the pack.

Fig. 2 is a longitudinal sectional view taken on lines 2—2 of Fig. 1.

Fig. 3 is a cross-sectional view taken on lines 3—3 of Fig. 1.

Fig. 4 is an elevational view of the inside packet with portions of the light-excluding wrapper being broken away from the chamber enclosing the film.

Fig. 5 is a vertical sectional view on lines 5—5 of Fig. 4.

Fig. 6 is a cross-sectional view on lines 6—6 of Fig. 4.

Fig. 7 is a cross-sectional view of a modified form of inner packet in which a single series of channels is shown instead of the double channels as shown in Fig. 6.

Referring now specifically to the drawings and in which like reference characters refer to like parts throughout, the completed package is illustrated in Fig. 1 of the drawings and comprises an outer envelope 10 in the usual form having a face 11, a closure member 12 which extends across the open end of the envelope and down alongside the back 13 of the envelope and may be secured thereto or left open, as may be desired. A liner 14 is secured to the back 13 of the envelope, this liner preferably consisting of lead foil, or the like, which absorbs X-rays and prevents the rays from being reflected back from any surface upon which the package is placed when an X-ray picture is being taken. The face 11 of the envelope 10 has an area 15 thereon which is defined by vertical and horizontal lines 16 and 17, these lines defining the area of the X-ray film which is enclosed in the inner packet, as hereinafter described, and serving as a guide to the technician taking a photograph, so that the area of the body which is intended to be photographed will not extend outside of area 15 and also, because of the position of the lead foil 14, is designated as the face of the package so that the object to be photographed is placed between the X-ray tube and the face 11 of the package 10. This envelope also may be used by the physician for memorandum purposes containing information with respect to the patient, and the like, necessary for the maintenance of the physician's records, and the like.

An inner packet 18 is provided which is generally rectangular in shape and of a size to be placed into and removed from the envelope 10 hereinabove described. This packet consists of a rectangle made up of side members 19 and 20 and end members 21 and 22, the side and end members being built up of laminated layers of material to the desired thickness, or can be made of single pieces of cardboard, plastic, or the like, formed to the necessary thickness, with theside frame members 19 and 20 preferably being solid so that rays of light cannot pass through the sides. The side frame members 19 and 20 are joined with the end members 21 and 22 to produce a chamber 23 therein, rectangular in form and within which an X-ray film 24 is mounted by means of top clips 25, 25 which are mounted upon spring stems 26, 26, having their ends mounted in the side frame members 19 and 20 respectively, with bottom clips 27, 27 being provided which engage the lower end of the film 24 and are mounted upon stems 28, 28 which extend downwardly into the end frame member 22 of the packet 18. The stems 26, 26 must possess considerable flexibility and be strong enough to keep the film 24 fairly taut at all times to insure proper processing and to compensate for the stretching of wet film and for the shrinking of the film as it dries after the final steps of processing. The side and end members of the frame may be laminated or unitary in structure and composed of cardboard, plastic, or the like, as may be desirable. The end frame member 21 is composed of an inner member 29 and outer members 30 and 31 on each side thereof and corrugated strips of material 32 and 33 placed between the inner member 29 and each of the outer members 30 and 31, the channels 34, 34 in the strips 32 and 33 extending diagonally of the said strips 32 and 33. The strips 32 and 33 are placed in side-to-side relation with each other, with the ends of the channels 34, 34 in register with each other but extending in one direction in each of the strips 32, 32 and in the opposite direction in the strips 33, 33, so adjacent sets of channels 34, 34 extend at right angles to each other. A plurality of strips 32 and 33 are placed in side-to-side relation with each other on both sides of the inner member 29 so the channels 34 form a tortuous or angular set of passages in the end member 21 from its outer edge to its inner edge forming lines of angular flow for fluid or air into or out of the chamber 23 within which the film 24 is mounted but which, because of their tortuous character, will not admit light to the chamber 23 wherein is mounted the sensitized film 24.

The end frame member 22 is built up in precisely the same manner as is the end member 21, with a central strip 29 and outer strips 30 and 31, and corrugated material 32 and 33 whereby communicating channels 34, 34 are formed, having their ends in communication with each other but diagonally disposed so that fluid, air, or the like, can pass out of the chamber 23 when the packet is immersed in the processing fluids. The processing fluids, of course, being heavier than air, will drive the air out of the chamber 23 whether the packet is placed in a flat tray containing a processing fluid or is placed in vertical position in a tank or receptacle containing processing fluid so the processing fluids come in contact with the sensitized film during the processing of the film after it has been exposed to X-rays. A flexible wrapper 35, opaque to light rays but transparent to X-rays, is provided which preferably is mounted along one of its side edges to one of the side frame members 19 or 20 and extends around the frame 24 with its ends in overlapped relation with each other, and is secured along its lower edge 36 to each face of the end member 22 by being lightly glued thereto or otherwise held in light-excluding position along its marginal edge 36 while the wrapper 35 along its upper edge 37 is secured to the side faces of the end member 27 in the same fashion, so that light cannot penetrate into the chamber 23 either through the tortuous channels 34 in each of the end members 21 or 22 or underneath the edges of the wrapper 35. A tear cord 38 is provided which extends parallel with the side frame members 19 and 20 and in which the operator, by using the tear cord, can split the wrapper 35 after the film has been completely processed and has now been converted to a negative, or this can be done immediately after the film has received the fixing bath and the wrapper 35 removed so that the X-ray film can be viewed either by the naked eye or placed in the usual viewing machine, as may be desired.

In Fig. 7 a slightly modified structure is shown of a somewhat thinner packet and in which side frame members 39 and 40 are provided with end members such as 41, with the said end members being built of single layers of corrugated material 42 in side-to-side relation with each other instead of the double layers shown in Fig. 6, with the channels 34 of the corrugations being placed in communicatng end-to-end relation with each other but diagonally disposed so that light which travels in a straight line cannot enter the chamber formed in the frame, within which the film 24 is mounted and through which fluid may be admitted to the chamber at one end while air passes out of the chamber at the opposite end of the frame, which member is constructed of a single layer of corrugation in the same fashion as is illustrated in Fig. 7. A second end member, similar to the one illustrated, should be provided for the opposite end of a frame of which the member 41 forms a part.

In operation a physician or X-ray technician uses the package as illustrated in Fig. 1 and when desiring to take an X-ray picture of a hand, wrist, or the like, places the entire pack in proper relation to the X-ray tube, with the face marked with the rectangular area facing the X-ray tube and the back of the pack facing away from the tube and takes the picture in the usual fashion, with the X-rays penetrating the various wrappings, and the like, and after the picture is taken he can remove the film pack from the exposure position and open the outer envelope, remove the packet from the outer envelope, place the packet in a tank containing developer fluid and agitate the fluid in the tank so as to bring the fluid into contact with the film in order to develop the film and as the packet is placed in the developer fluid, the fluid being heavier than air drives the air out of one end of the packet, all air is removed from the packet by the fact that the liquid is heavier than the air and when, in the judgment of a technician, the packet has been in contact with the developer fluid a sufficient length of time it can be removed from the developer fluid and the packet rinsed so that the major portion of the developer fluid is removed from the surface of the film and then placed in a fixing bath. After the packet has been removed from the fixing bath, the wrapper 35 can be split by the use of the tear cord 38 and removed from the packet, and the film (now converted into a negative) is open to view, and can be examined by the technician or by the physician with a naked eye or through a viewing machine and observed a sufficient length of time to determine the results that have been obtained. Also, the technician or physician can determine whether the picture is adequate or sufficient and, if not, another picture can be taken immediately while the patient is available, and the process repeated. If in the judgment of the technician the picture is adequate and complete, then the negative can be returned to the fixing bath and when this process is completed the negative is thereupon washed thoroughly to remove the fixing fluid and in this form the negative is complete and can be dried in the manner of ordinary negatives, placed back into the envelope containing any records of the technician or physician's diagnoses which he may deem desirable, and the package thereupon becomes a part of the permanent records of the physician with respect to the particular patient under observation or whom the physician is treating. In this manner the whole technique of taking and developing an X-ray picture can be performed within the ordinary office of the physician without the necessity of going to a dark room or, as a matter of fact, without leaving the room where a physician is working with a patient and in a matter of a few moments the pictures are available for use while the physician is in consultation with his patient. Likewise, these packets can be used in connection with operations which are being performed where the pictures can be taken during the progress of an operation and returned to the physician for an opportunity to view them during the performance of the operation. In this manner the results of the operation and the progress can be easily and quickly determined by the physician and his consultants.

While we have described more or less precisely the details of construction, we do not wish to be understood as limiting ourselves thereto, as we contemplate changes in form, the proportion of parts and the substitution of equivalents as circumstances may suggest or render expedient without departing from the spirit or scope of our invention.

What is claimed is:

1. An X-ray film packet comprising in combination a frame consisting of spaced parallel extending side members, a pair of spaced end members secured to the said side members, spring mounted clips secured to said frame, an X-ray film mounted in said clips under tension and a removable wrapper secured to the frame member at one of its ends and extending around the frame and film, with its ends overlapped and secured together and having its marginal edges secured to the end members, the said wrapper being transparent to X-rays and opaque to ordinary light rays, the frame members having corrugated material therein, with the corrugations in said material extending in angular relation with each other whereby light is excluded from the interior of said packet but fluid may pass through the said corrugations to the interior of the said packet.

2. An X-ray film packet comprising in combination a frame consisting of spaced parallel extending side members, a pair of spaced end members secured to the said side members, spring mounted clips secured to said frame, an X-ray film mounted in said clips under tension and a removable wrapper secured to the frame member at one of its ends and extending around the frame and film, with its ends overlapped and secured together and having its marginal edges secured to the end members, the said wrapper being transparent to X-rays and opaque to ordinary light rays, the end members having corrugated material therein, with the corrugations in said material extending in angular relation with each other whereby light is excluded from the interior of said packet but fluid may pass through the said corrugations to the interior of the said packet.

3. An X-ray film packet comprising in combination a frame consisting of spaced parallel extending side members, a pair of spaced end members secured to the said side members, spring mounted clips secured to said frame, an X-ray film mounted in said clips under tension and a removable wrapper secured to the frame member at one of its ends and extending around the frame and film, with its ends overlapped and secured together and having its marginal edges secured to the end members, the said wrapper being transparent to X-rays and opaque to ordinary light rays, the oppositely positioned frame members having strips of corrugated material therein in edge-to-edge relation with each other, the corrugations in one strip being angularly disposed with relation to the corrugations in an adjacent strip whereby communicating channels are formed in said frame members extending from the external edge of the said frame members to the internal edge thereof whereby light rays are excluded from the interior of said packet but fluid may pass into and out of the interior of the said packet.

4. An X-ray film packet comprising in combination a frame consisting of spaced parallel extending side members, a pair of spaced end members secured to the said side members, spring mounted clips secured to said frame, an X-ray film mounted in said clips under tension and a removable wrapper secured to the frame member at one of its ends and extending around the frame and film, with its ends overlapped and secured together and having its marginal edges secured to the end members, the said wrapper being transparent to X-rays and opaque to ordinary light rays, the end members having a plurality of corrugated strips therein in edge-to-edge relation with each other, the corrugations in each strip being angularly disposed with respect to the corrugations in the adjacent strip, the said corrugations forming channels in said end members which extend in edge-to-edge relation through the said end members and form communicating passages for liquid and air to the interior of the packet and in which light rays are excluded.

5. An X-ray film packet comprising in combination a frame consisting of spaced parallel extending side members, a pair of spaced end members secured to the said side members, spring mounted clips secured to said frame, an X-ray film mounted in said clips under tension, a removable wrapper secured to the frame member at one of its ends and extending around the frame and film, with its ends overlapped and secured together and having its marginal edges secured to the end members, the said wrapper being transparent to X-rays and opaque to ordinary light rays, the frame members having corrugated material therein, with the corrugations in said material extending in angular relation with each other whereby light is excluded from the interior of said packet but fluid may pass through the said corrugations to the interior of the said packet and an enclosure member for said packet having an X-ray absorbent sheet in one side thereof.

References Cited in the file of this patent

UNITED STATES PATENTS

| | | |
|---|---|---|
| 1,370,858 | Tousey | Mar. 8, 1921 |
| 1,563,362 | Herradora | Dec. 1, 1925 |
| 1,879,498 | Richards et al. | Sept. 27, 1932 |
| 2,520,641 | Land | Aug. 29, 1950 |